United States Patent
Lew et al.

(10) Patent No.: US 10,064,049 B1
(45) Date of Patent: Aug. 28, 2018

(54) DID LINE TYPE PROVISIONING VERIFICATION

(71) Applicant: SALESFORCE.COM, INC., San Francisco, CA (US)

(72) Inventors: Eugene Lee Lew, Olney, MD (US); Vasileios John Gianoukos, Winchester, MA (US)

(73) Assignee: SALESFORCE.COM, INC., San Francisco, CA (US)

( * ) Notice: Subject to any disclaimer, the term of this patent is extended or adjusted under 35 U.S.C. 154(b) by 97 days.

(21) Appl. No.: 15/389,541

(22) Filed: Dec. 23, 2016

Related U.S. Application Data

(63) Continuation of application No. 14/459,919, filed on Aug. 14, 2014, now Pat. No. 9,532,197, which is a continuation-in-part of application No. 13/441,105, filed on Apr. 6, 2012, now abandoned, which is a continuation-in-part of application No. 13/111,109, filed on May 19, 2011, now Pat. No. 8,918,085, which is a continuation-in-part of application No. 12/535,323, filed on Aug. 4, 2009, now Pat. No. 8,694,031.

(Continued)

(51) Int. Cl.
| | |
|---|---|
| H04W 8/28 | (2009.01) |
| H04L 12/58 | (2006.01) |
| H04W 4/14 | (2009.01) |
| H04M 3/42 | (2006.01) |
| H04L 29/12 | (2006.01) |

(52) U.S. Cl.
CPC ............... *H04W 8/28* (2013.01); *H04L 51/36* (2013.01); *H04L 51/38* (2013.01); *H04L 61/1505* (2013.01); *H04M 3/42331* (2013.01); *H04W 4/14* (2013.01)

(58) Field of Classification Search
CPC ........................................................ H04W 8/28
See application file for complete search history.

(56) References Cited

U.S. PATENT DOCUMENTS

| | | | |
|---|---|---|---|
| 6,415,250 | B1 | 7/2002 | van den Akker |
| 6,449,483 | B1 * | 9/2002 | Akhteruzzaman ...... H04W 8/26 455/445 |

(Continued)

FOREIGN PATENT DOCUMENTS

| | | |
|---|---|---|
| GB | 2397730 B | 6/2006 |
| GB | 2431820 A | 5/2007 |
| WO | 2007015075 | 2/2007 |

OTHER PUBLICATIONS

International Search Report for International Application No. PCT/US2009/052715 dated Sep. 24, 2009.

(Continued)

*Primary Examiner* — Omoniyi Obayanju
(74) *Attorney, Agent, or Firm* — Chapin IP Law, LLC

(57) ABSTRACT

A messaging hub provides communication services for user devices associated with an enterprise office telephone number. The messaging hub establishes a secure connection between the messaging hub local SMSC/MMSC and a data adapter of a unified communications service, provision the enterprise office telephone number for use in a global SMS/MMS network and delivers messages addressed to the enterprise office telephone number to selected user devices.

10 Claims, 6 Drawing Sheets

Related U.S. Application Data

(60) Provisional application No. 61/868,258, filed on Aug. 21, 2013, provisional application No. 61/164,705, filed on Mar. 30, 2009.

(56) References Cited

U.S. PATENT DOCUMENTS

| | | | |
|---|---|---|---|
| 6,591,103 | B1 | 7/2003 | Dunn et al. |
| 6,690,932 | B1 | 2/2004 | Barnier et al. |
| 6,757,365 | B1 | 6/2004 | Bogard |
| 7,010,312 | B1 | 3/2006 | Zechlin |
| 7,197,035 | B2 | 7/2007 | Asano |
| 7,263,076 | B1 | 8/2007 | Leibovitz et al. |
| 7,275,104 | B1 | 9/2007 | Martinez et al. |
| 7,343,168 | B2 | 3/2008 | Valloppillil |
| 7,380,022 | B2 | 5/2008 | Tell et al. |
| 7,446,655 | B2 | 11/2008 | Jha et al. |
| 7,499,704 | B1 | 3/2009 | Bonner |
| 7,564,958 | B1 | 7/2009 | Contractor |
| 7,606,568 | B2 | 10/2009 | Gallagher et al. |
| 7,693,535 | B2 | 4/2010 | Dunko |
| 7,734,908 | B1 | 6/2010 | Kung et al. |
| 7,860,525 | B2 | 12/2010 | Parkkinen et al. |
| 7,865,198 | B2 | 1/2011 | Shin |
| 7,940,896 | B2 | 5/2011 | Prozeniuk et al. |
| 8,463,304 | B2 | 6/2013 | Lauer et al. |
| 8,520,833 | B1 | 8/2013 | Pettay et al. |
| 8,989,712 | B2 | 3/2015 | Doulton |
| 2003/0101244 | A1 | 5/2003 | Lockridge et al. |
| 2004/0076144 | A1 | 4/2004 | Ishodoshiro |
| 2004/0109452 | A1 | 6/2004 | Takihiro et al. |
| 2004/0137923 | A1 | 7/2004 | Lang |
| 2005/0148353 | A1 | 7/2005 | Hicks et al. |
| 2005/0149335 | A1 | 7/2005 | Mesbah et al. |
| 2005/0277407 | A1 | 12/2005 | Ahn et al. |
| 2005/0288045 | A1 | 12/2005 | Yang et al. |
| 2006/0040606 | A1 | 2/2006 | Kangas |
| 2006/0123360 | A1 | 6/2006 | Anwar et al. |
| 2006/0142012 | A1 | 6/2006 | Kirchhoff et al. |
| 2006/0148495 | A1 | 7/2006 | Wilson |
| 2006/0259473 | A1 | 11/2006 | Li et al. |
| 2007/0026901 | A1 | 2/2007 | McKay |
| 2007/0032225 | A1 | 2/2007 | Konicek et al. |
| 2007/0066318 | A1 | 3/2007 | Danzeisen et al. |
| 2007/0073585 | A1 | 3/2007 | Apple et al. |
| 2007/0190978 | A1 | 8/2007 | White et al. |
| 2008/0004968 | A1* | 1/2008 | Nakao .................. G06Q 30/02 705/26.3 |
| 2008/0043969 | A1 | 2/2008 | Shi |
| 2008/0045250 | A1 | 2/2008 | Hwang |
| 2008/0114862 | A1 | 5/2008 | Moghaddam et al. |
| 2008/0140850 | A1 | 6/2008 | Gade et al. |
| 2008/0172496 | A1 | 7/2008 | Middleton et al. |
| 2008/0182563 | A1 | 7/2008 | Wugofski et al. |
| 2008/0263137 | A1 | 10/2008 | Pattison et al. |
| 2008/0270556 | A1 | 10/2008 | Bamford |
| 2008/0293404 | A1 | 11/2008 | Scherzer et al. |
| 2009/0005005 | A1 | 1/2009 | Forstall et al. |
| 2009/0031232 | A1 | 1/2009 | Brezina et al. |
| 2009/0154434 | A1 | 6/2009 | Tanaka et al. |
| 2009/0156202 | A1 | 6/2009 | Reiss et al. |
| 2009/0186634 | A1 | 7/2009 | Sureka et al. |
| 2009/0319914 | A1 | 12/2009 | Roseway et al. |
| 2010/0029273 | A1 | 2/2010 | Bennet |
| 2010/0124905 | A1 | 5/2010 | Pratt et al. |
| 2011/0142211 | A1 | 6/2011 | Maes |
| 2012/0226759 | A1 | 9/2012 | Lew et al. |
| 2013/0196697 | A1 | 8/2013 | Lew et al. |
| 2013/0252649 | A1 | 9/2013 | Siomina et al. |
| 2014/0106701 | A1 | 4/2014 | Silver et al. |
| 2014/0179260 | A1 | 6/2014 | Malin |
| 2014/0269679 | A1 | 9/2014 | Gillis et al. |

OTHER PUBLICATIONS

International Search Report and the Written Opinion of the International Searching Authority for International Application No. PCT/US2011/037190; dated Dec. 7, 2011.

European Search Report for European Application No. EP 09805443; dated Dec. 11, 2013.

International Search Report and the Written Opinion for International Application No. PCT/US2016/029667, 3 Pages, dated Aug. 5, 2016.

International Search Report and the Written Opinion of the International Searching Authority for PCT/US2016/029665, 12 pages, dated Aug. 11, 2016.

* cited by examiner

DID LINE TYPE PROVISIONING VERIFICATION

CROSS REFERENCE TO RELATED APPLICATIONS

This application is a continuation of U.S. patent application having Ser. No. 14/459,919, entitled "DID LINE TYPE PROVISIONING VERIFICATION", filed Aug. 14, 2014, which claims the benefit of U.S. provisional patent application Ser. No. 61/868,258, entitled " DID LINE TYPE PROVISIONING VERIFICATION", filed Aug. 21, 2013, and is a continuation in part of U.S. patent application having Ser. No. 13/441,105 entitled "MESSAGING HUB SYSTEM," filed Apr. 6, 2012, now Abandoned, that shares inventorship with the present application and which is a continuation in part of U.S. patent application having Ser. No. 13/111,109 entitled "SOCIAL MESSAGING HUB," filed May 19, 2011, now U.S. Pat. No. 8,918,085 issued Dec. 23, 2014, that shares inventorship with the present application and which is a continuation in part of U.S. patent application having Ser. No. 12/535,323 entitled "SMS TECHNOLOGY FOR COMPUTERIZED DEVICES," filed Aug. 4, 2009, now U.S. Pat. No. 8,694,031 issued Apr. 8, 2014, that shares inventorship with the present application and which claims the benefit of U.S. provisional patent application Ser. No.: 61/164,705, entitled "SMS Technology for Computerized Devices," filed Mar. 30, 2009; that shares inventorship with the present application. The entire teachings and contents of these Patent Applications are hereby incorporated by reference herein in their entireties.

FIELD OF THE INVENTION

The present invention relates to messaging and communications, and to mobile telephony, text messaging, instant messaging, multimedia messaging, enterprise office systems, residential phone lines, unified communications service, personal computers and data enabled digital devices.

BACKGROUND

People around the world are confronted by a number of communications and writing devices which have evolved relatively recently from the separate areas of telephone communications networks, wireless networks, television or cable networks, and computer networks and personal computers. The more recent devices—mobile phones with message/picture/video texting, personal digital devices for Internet browsing and computer-based blogging and networking sites—have been shaped in part by the separate networks of origin, but the nature and capabilities of many of these now-ubiquitous devices have both converged, and also advanced quickly in different directions as the industries controlling each sector have capitalized on their market power, reservoir of legacy subscribers and, in some cases, regulatory barriers and proprietary network equipment and connection protocols, to introduce new consumer features, often employing developments from other consumer products, and aiming to lure subscribers by mimicking those products. However, in doing so, each industry has also been limited by its own equipment, data transfer speeds and connection abilities.

Thus, as digital imaging advanced and consumers learned to take and handle images and to attach the images to e-mail messages, imaging chipsets were incorporated into mobile telephones and the mobile phones were configured to display images and allow their transmission between phones. Text and message protocols allowed transmission of 'instant' messages, and coded standardized greetings and messages between phone users, filling a niche for immediate portable, personal communication that was not met by existing personal computer devices. Devices like the iPhone®, introduced in 2007 allowed a user to access his Internet-based email from his mobile phone via a specially-configured data connection with his mobile service provider, and to exchange content via wireless connection to his personal computer.

However, despite these developments blurring boundaries between the classical phone, mobile telephone, Internet, wireless and television or cable networks, there has not been a convergence. Rather, although industry and government groups have promoted interface standards for several different classes of data or communication, each industry has retained much of its special structure, and the devices served by an industry (such as mobile telephones) may find their feature set constrained by intrinsic limitations of bandwidth and connectivity, by available networking equipment base, and by the level of contractual cooperation agreements of its provider. The many different classes of communications systems now available, and the many separate provider networks in each class, have also required the development of new supporting entities, such as nationally—or internationally-extending registries, aggregators, exchanges and other entities, in order to affect timely transfer of data, messages and/or entertainment content. This second-level infrastructure imposes further constraints of the feasible, or economically feasible, set of features that a consumer may exercise. Thus, for example, mobile telephones have been augmented with a display and the ability to run small applications such as games, MP3 players, Internet browsers/applications and email retrieval, while personal computers have the capability to run larger programs, employ wireless connectivity and perform voice-over-IP (VOIP) Internet communications. Various special-purpose applications requiring cross-platform connections may be provided, or applications simulating cross-platform capabilities may be developed, by a service provider, such as a television-displayed chat session available for subscribers of a TV provider. However, many other personal devices while having large data capacity, ability to connect to another user device and ability to run entertainment apps, may entirely lack the mobile telephone electronic circuitry necessary for exchanging mobile messages with telephone users. Additionally, the delivery of messages in some messaging systems is affected by limitations of carrier networks and international boundaries. It is therefore desirable to provide a system for enhanced communication between personal devices.

Although, email, IM and web surfing can be monitored and audited at an Enterprise level, the ability to monitor, audit, or filter an Enterprise's personnel's electronic communications in addition to securing corporate assets by such communications has not been possible with regard to SMS/MMS previously due to the nature of traditional SMS/MMS. Traditional SMS/MMS is based on Signaling System No. 7, analog telephone signaling protocols (SS7) switching technology and on a physically separate network to which an Enterprise has no visibility or access.

While personnel at an Enterprise may be using mobile phones or tablets that are provided and paid for by the Enterprise, currently, there is no method by which to determine what the SMS/MMS communications is being used for (e.g., company business, personal business, or a leak of confidential and proprietary information) unlike other electronic communications methods (digital: email, IM, etc.) which are easily tracked/monitored. This is an issue, especially for trade secrets, financial data of publicly traded companies, and Merger & Acquisition activity information.

Enterprises have never had ability to monitor or audit a service that they do not manage such as the PSTN beyond rudimentary time based usage statistics. Carriers cannot retain the message content of SMS messages due to the sheer volume of the enormous amount of data based on the quantity of SMS messages that flow through its network. Enterprises have in some cases made it corporate policy that SMS/MMS usage is NOT allowed (e.g., some Wall St financial institutions have done this) in an attempt to prevent leakage of sensitive data via SMS/MMS. One barrier to solving this problem has always been the physical separation of the networks involved (PSTN vs. Internet) and technology (SS7 vs. IP). The problem cannot be solved if the Enterprise cannot obtain physical access to the network where the problem is occurring. In theory, carriers could technically solve the issue, but the carriers would be prevented by privacy laws and even if granted relief from privacy laws, the task due to the sheer volume of data would make it cost prohibitive to be justified.

SMS is a carrier service that an Enterprise has zero control over. Additionally, carriers do not monitor or retain SMS message content (except for very short, finite periods). Thus an Enterprise, even if suspicious of possible leaks of its proprietary data (trade secrets, financial, M&A), has no recourse to determine the source of these leaks as the carriers do not have the data retention policies or the ability to search historical SMS.

A unified communication (UC) service is the integration of real-time communication services such as instant messaging (chat), presence information, telephony (including IP telephony), video conferencing, data sharing, call control and speech recognition with non-real-time communication services such as unified messaging (integrated voicemail, e-mail, SMS and fax). UC is not necessarily a single product, but a set of products that provides a consistent unified user interface and user experience across multiple devices and media types. There have been attempts at creating a single product solution however the most popular solution is dependent on multiple products. In its broadest sense UC can encompass all forms of communications that are exchanged via the medium of the TCP/IP network to include other forms of communications such as Internet Protocol Television (IPTV) and Digital Signage Communications as they become an integrated part of the network communications deployment and may be directed as one to one communications or broadcast communications from one to many.

UC service allows an individual to send a message on one medium and receive the same communication on another medium. For example, one can receive a voicemail message and choose to access it through e-mail or a cell phone. If the sender is online according to the presence information and currently accepts calls, the response can be sent immediately through text chat or video call. Otherwise, it may be sent as a non-real-time message that can be accessed through a variety of media.

Landline phones (also referred to as classical phones, fixed line phone) and associated phone numbers are not capable of mobile messaging functions. Landline phones generally operate on direct inward dial (DID) lines. They are only used for voice functions, and by their nature, are not "mobile." Thus, in order to provide a mobile contact point, users must secure a separate mobile phone number associated with a mobile device to receive services such as text messaging and other capabilities. In a business setting, employees generally are assigned a business phone number and these business numbers are managed by a private branch exchange PBX or computerized branch exchange (CBX).

A problem exists within in the telecom industry of North America regarding potential conflicts that can result in disablement of some or all of the services associated with a phone number. Currently non-carriers (service providers) have the ability to buy phone numbers from carriers and provide services via the Internet. In order for the services to be provided a telephone line and corresponding number must be provisioned correctly. Erroneous provisioning of a phone number in the US and Canada for SMS can occur when phone number ownership is transferred through multiple entities. Errors can occur, for example, when resellers transfer line numbers to other resellers, when numbers have previously been provisioned for SMS communications with a one particular service provider or carrier; and when and a landline which is not equipped to accommodate SMS (e.g., a line connected to a dumb voice handset) is provisioned for SMS communications. A primary difficulty has been identifying, locating a minimal set of authoritative databases to query in a communications ecosystem that is unstructured and unregulated on a global level.

SUMMARY OF THE INVENTION

Enterprise landline phones and residential landline phones are not generally capable of mobile messaging functions. Associated enterprise phone numbers are not used for indicating the source or destination of SMS messages. Currently, enterprises have no ability to monitor or audit SMS communications of its personnel or to apply spam filters to SMS message. Configurations disclosed herein substantially overcome the shortcomings of conventional messaging and enterprise communications systems. In particular a technique for enabling a telephone number to be used for SMS/MMS/EMS message communication includes identifying the telephone number associated with a line, determining whether the telephone number exists in a local database, selecting at least one third party database to query, establishing a connection to the selected third party database, formulating a query to be sent to the selected third party database, sending the query to the selected third party database, receiving a response from the selected third party database and processing the response to determine a status of the line.

Embodiments disclosed herein utilize predetermined database rankings and perform queries and implement a decision process to determine "state status" and proper path to process (or not) the enablement and provisioning of SMS services associated with a new or alternative service provider from the phone number's conventional services (typically 'voice' based functions).

A further embodiment includes provisioning the line for SMS/MMS service in response to determining that the line has not been enabled for SMS/MMS service. Provisioning the line includes associating the telephone number with a messaging hub and adding the telephone number and an identifier of the associated messaging hub to a plurality of database directories to enable the telephone number for SMS/MMS communication.

A messaging hub for enterprise Short Message Service/Multimedia Messaging Service/Enhanced Messaging Service (SMS/MMS/EMS) communications includes an interface to a local SMSC/MMSC, at least one application server coupled to the local SMSC/MMSC through the interface. The local SMSC/MMSC is an interfaced to at least one external SMSC/MMSC in an external SMS/MMS/EMS network. The hub further includes a database coupled to at least one database server coupled to the application server providing contact management data, application management data and message management data, an interface between the messaging hub and a data adapter of a unified communications service, a memory including one or more instructions stored thereon that, when executed by one or more processors, cause the one or more processors to perform operations including identifying the telephone number associated with a line, determining whether the telephone number exists in a local database, selecting at least one third party database to query, establishing a connection to the selected third party database, formulating a query to be sent to the selected third party database, sending the query to the selected third party database, receiving a response from the selected third party database and processing the response to determine a status of the line.

It is to be understood that the features of the messaging hub can be embodied strictly as a software program, as software and hardware, or as hardware alone such as within a single processor or multiple processors, or within an operating system or within a software application.

A computer readable storage medium for tangibly storing thereon computer readable instructions for a messaging application having an on premise component and a messaging hub component, the messaging hub component having for a method includes instructions for identifying the telephone number associated with a line, determining whether the telephone number exists in a local database, selecting at least one third party database to query, establishing a connection to the selected third party database, formulating a query to be sent to the selected third party database, sending the query to the selected third party database, receiving a response from the selected third party database and processing the response to determine a status of the line.

It is to be understood that the features of the messaging hub can be embodied strictly as a software program, as software and hardware, or as hardware alone such as within a single processor or multiple processors, or within an operating system or within a software application.

Other arrangements of embodiments disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing test systems explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other media such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. Embodiments of the system can be distributed between many software processes on several data communications devices, or all processes could run on a small set of dedicated computers or on one computer alone.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION

A messaging hub, as disclosed herein, enables users to have "one telephone number" for their communications including voice and mobile messaging, versus having two separate telephone numbers (one for a land line and one for mobile). The messaging hub and related applications and interfaces are referred to herein as messaging hub or messaging hub system. A provisioning procedure as disclosed herein, prevents erroneous provisioning of DID lines that may not be able to accommodate SMS or lines which are already allocated to another service provider for SMS communications. This procedure is a new service that includes determining authoritative databases and querying on or more authoritative database. In one embodiment, the North American numbering system (all +1 phone numbers) is used to determine if the phone number is allocated, and if so, by whom, whether the phone number is enabled for SMS service, and what entity is the SMS communications service provider.

The techniques disclosed herein can be used for both Business DID lines and non-business (e.g., residential DID lines). The techniques are used after a potential customer for SMS communications services goes to a website or downloads App, enter their business fixed-line DID phone number or residential which is to become SMS enabled; Then the system would query authoritative database to determine various detail of the phone number as described below in greater detail. If the database query reports favorable information (e.g., the SMS service provides has not been allocated) then the system enables/provisions the business or residential DID line immediately in real-time for SMS communications.

In certain embodiments the messaging hub enables the monitoring, auditing and filtering of SMS/MMS communications by Enterprise personnel without changing the basic function of SMS/MMS by operating SMS/MMS over IP technology and implementing tools for inspection purposes on the messaging hub to enable Enterprises to collect or alert when certain triggers are activated. The method of operating SMS/MMS over IP and implementing specifically for Enterprises (e.g.—utilize landline phone number assigned to Enterprise personnel or give out new 'virtual phone numbers') facilitates such an environment.

As used herein, the term telephone number (also referred to as a phone number, an office telephone number, a residential phone number, a landline phone number, a direct inward dial (DID) phone number), generally refers to an identifier associated with a telephone line or telephone service. In some embodiments the telephone number are in an e.164 number format which is an ITU-T standard. The telephone line can be a business line, a PBX line, a residential line and the line can be a DID line.

Figure 1:
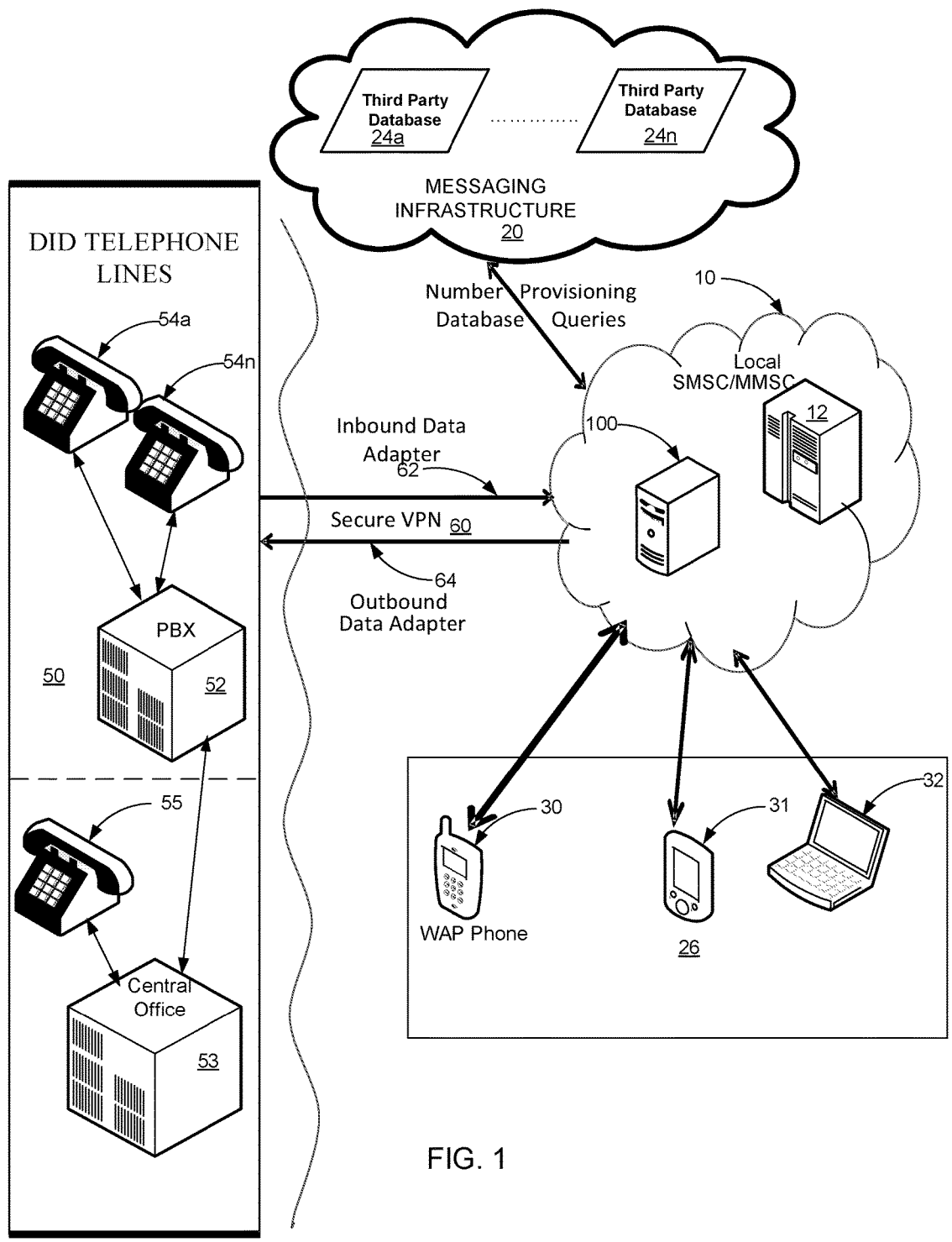
FIG. 1 is a schematic illustration of a messaging hub, a unified communications service and network environment/ messaging infrastructure in accordance with one example embodiment disclosed herein.

Now referring to FIG. 1, an exemplary messaging hub 100 operates in network environment 10 and can communicate with and relay messages to user devices, for example, a data enabled mobile phone 30, a data enabled WiFi phone 31 and other data enabled devices (not shown) such as a laptop, netbook, tablet and a smart phone. The messaging hub 100 communicates with a unified communication service (UCS) 50, in one embodiment, over a secure connection 60 (e.g. VPN connection). The unified communication service 50 generally includes a PBX 52 or alternatively a CBX (not shown) and communicates data and number provisioning information over an inbound data adapter 62 and outbound data adapter 64 operating within the secure VPN connection 60. The PBX 52 is connected to office phones 54a-54n (and associated lines and phone numbers). The PBX 52 and residential phones 55 (and associated lines and phone numbers) are connected to a central office 53. In addition to phone numbers, data transferred between the unified communication service 50 and the messaging hub 100 includes but is not limited to: SMS/MMS/EMS messages, administrative information such as origin, destination and other custom and proprietary data associated with the messages, carrier or provider information.

SMS/MMS/EMS messages can also be sent and received directly between UCS 50 to and from data enabled devices 26 relayed through Local SMSC/MMSC 12 or global SMSC/MMSC 13 if the UCS 50 is equipped to accommodate SMS/MMS traffic.

In operation, the messaging hub 100 establishes a secure connection to a local short message service center/multimedia message service center SMSC/MMSC 12 and the data adapters 62 and 64 of unified communications service 50. The SMSC/MMSC 12 is a network element in the network environment 10, and the SMSC/MMSC 12 stores, forwards, converts and delivers SMS/MMS messages. A local SMSC/MMSC is one that is either owned or operated or is accessible by the local operating entity associated with the message hub 100.

The messaging hub 100 identifies an enterprise office telephone number provided by the unified communications service 50. In one embodiment the messaging hub 100 identifies a block or pool of Enterprise office landline phone numbers (e.g.—617-555-0001 to 617-555-9999) to be mobile messaging enabled. The messaging hub 100 provisions the enterprise office telephone number and then messages can be directed to the enterprise office telephone number and received on one or more of the user's data enabled devices. The provisioning process is described in further detail below in conjunction with FIG. 6. The messaging hub 100 also communicates with third party databases 24a-24n in a messaging infrastructure 20.

Figure 2:
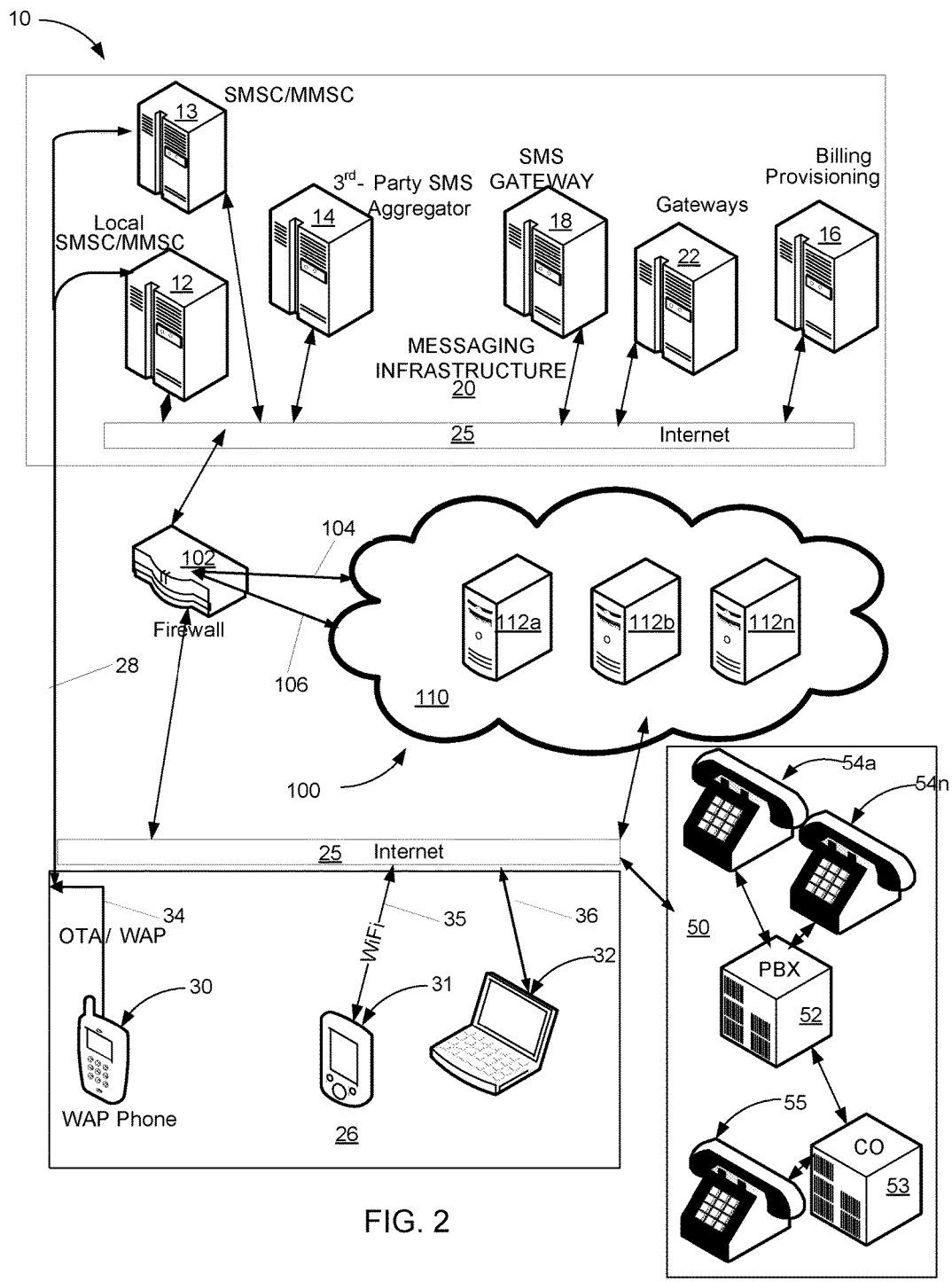
FIG. 2 is a more detailed schematic illustration of the messaging hub and messaging infrastructure of FIG. 1.

Now referring to FIG. 2, the exemplary messaging hub 100 operates in the network environment 10 which includes global messaging infrastructure 20. The messaging hub 100 includes one or more processors 112a-112n and is coupled to the network environment 10 and global messaging infrastructure 20 through a firewall 102. The firewall 102 is typically located at a messaging hub 100 hosting facility.

The global messaging infrastructure 20 includes, but is not limited to, a local Short Message Service Center/Multimedia Messaging Service Center (SMSC/MMSC) 12, a third party SMS/MMS aggregator 14 (also referred to a SMS/MMS aggregator 14), a billing and provisioning system 16, an SMS/MMS Gateway (SMS/MMS-GW) 18, messaging gateways 22 and a cellular phone infrastructure 28. Other components of the global messaging infrastructure 20 include an external (Global) SMSC/MMSC network 13 and additional SMS/MMS-Gateways and other SMSCs/MMSCs and billing and provisioning systems provided by additional mobile carrier service providers (not shown). The local SMSC/MMSC 12 and the billing and provisioning system 16 are typically operated by a mobile carrier service provider. The Global SMSC/MMSC network 13 is typically operated by multiple mobile carriers and third parties.

In one embodiment, the messaging hub 100 communicates with the systems in the global messaging infrastructure 20 (e.g., local SMSC/MMSC 12, the third party SMS/MMS aggregator 14 and the billing and provisioning system 16) using various network protocols including the Short Message Peer-to-Peer (SMPP) protocol, Hypertext Transfer Protocol (HTTP), Wireless Application Protocol (WAP), Signaling Transport (SIGTRAN) protocol or SS7 protocol. The SMPP protocol is a telecommunications industry protocol for exchanging SMS messages between SMS peer entities. The HTTP and WAP protocols are a telecommunications industry protocols for exchanging MMS messages between MMS peer entities.

In this embodiment, the link between the messaging hub 100 and the global messaging infrastructure 20 is secured by the firewall 102 using a virtual private network (VPN) connection with HTTPS using 128-bit or higher encryption, for example, 1024 bit (3DES-SHA1) encryption. Messages are transferred over SMPP link 104 and provisioning and single sign on (SSO), XML and SOAP messages and other control traffic are interchanged over control link 106. In another embodiment, messages are transferred over SIGTRAN (SS7 over IP) depending on the connection (e.g., a connection to a European Mobile Operator).

The messaging hub 100 is connected via the Internet 25 or a dedicated connection to the global messaging infrastructure 20 that relays messages between existing customer equipment, for example, a mobile phone 29, a data enabled mobile phone 30, a data enabled WiFi phone 31 and other data enabled devices (not shown) such as a laptop, netbook, tablet and a smart phone. The mobile phone 29 can be connected to the messaging hub 100 over the cellular phone infrastructure 28 through the local SMSC/MMSC 12 using an SMS protocol. The messaging hub 100 is connected via the Internet 25 or a dedicated connection to the unified communications service 50 of one or more business enterprises. The Global SMSC/MMSC network 13 is also connected to the cellular phone infrastructure 28. The data enabled mobile phone 30 can be connected to the messaging hub 100 over the cellular phone infrastructure 28 using a data connection provided by OTA/WAP protocols. A data enabled WiFi phone 31 can be connected to the messaging hub 100 via a WiFi connection to the Internet. It is understood that a mobile phone can be data enabled via both a WAP connection and a WiFi connection. The data enabled WiFi phone 31 is sometimes referred to as a dual mode phone if it can also connect over WAP.

In operation and as described below in more detail, the messaging hub 100 obtains a plurality of unique identifiers which in one embodiment, are telephone numbers acquired through or serviced by a competitive local exchange carrier (CLEC), local exchange carrier (LEC) or other provider that is authorized to issue or service registered phone numbers, and the set of numbers so issued may be serviced by that carrier's network, another carrier network or by a separate entity or sub-entity such as a network unaffiliated virtual operator (NUVO), that serves as the service provider to users and functions as a destination carrier to receive messages directed to its telephone numbers from the SMS aggregator 14, an SMS operator (e.g., a mobile carrier), a content provider or another NUVO, and to provide an Internet interface for delivery of the messages to users' data enabled devices 26.

More generally, embodiments of the messaging hub 100 include an application which enables a user (sometimes referred to herein as a subscriber) to perform SMS/MMS/EMS or chat activities using a data enabled device 26, such as an iPod Touch, iPad, portable e-Reader, a personal computer, a portable game player, a game console, a laptop, a television set or a netbook computer, all of which can connect to the Internet. Messaging is carried out bi-directionally between the data enabled device 26 (non-telephony device, smartphone or other data devices) and other SMS/MMS capable devices. The messaging hub 100 is implemented without any add-ons, that is, without requiring the user to attach accessory electronic devices, and is implemented via a the messaging hub 100 that maintains an Internet connected server that interfaces with certain wireless messaging facilities in the global messaging infrastructure 20 to establish device-to-wireless communications. In different embodiments, the messaging hub 100 may be a separate dedicated entity, or may be a service entity set up within a mobile service provider to service data enabled devices 26 of some of the provider's subscribers. Further, the messaging hub 100 may provide applications for managing the address books, messages and account information of the user.

When the messaging hub 100 is a separate message service center entity, the messaging hub 100 operations may be incorporated by one or more mobile providers to extend their subscriber service capabilities and the provider entity may provide dedicated connections for affecting coordination between services, call logs and billing for the affected accounts.

Features of the messaging hub 100 may be provided within, or as external hosting services communicating with an existing mobile network provider as a web based application using advanced web capabilities, and may be configured to handle all forms of messaging for the subscribers. In such embodiments, a web client application provides the user with a single integrated interface wherein the subscriber can view or send SMS/MMS/EMS messages, tweets (integrated with Twitter), chat (for which the system supports MSN or AIM or Yahoo or GoogleTalk or Facebook or other similar IM service as the chat client), or status, for example Facebook Status. Subscription/Unsubscription operations can be performed from a web client running on any data enabled device 26 that supports standard Internet browsers or from IP based applications.

Figure 3:
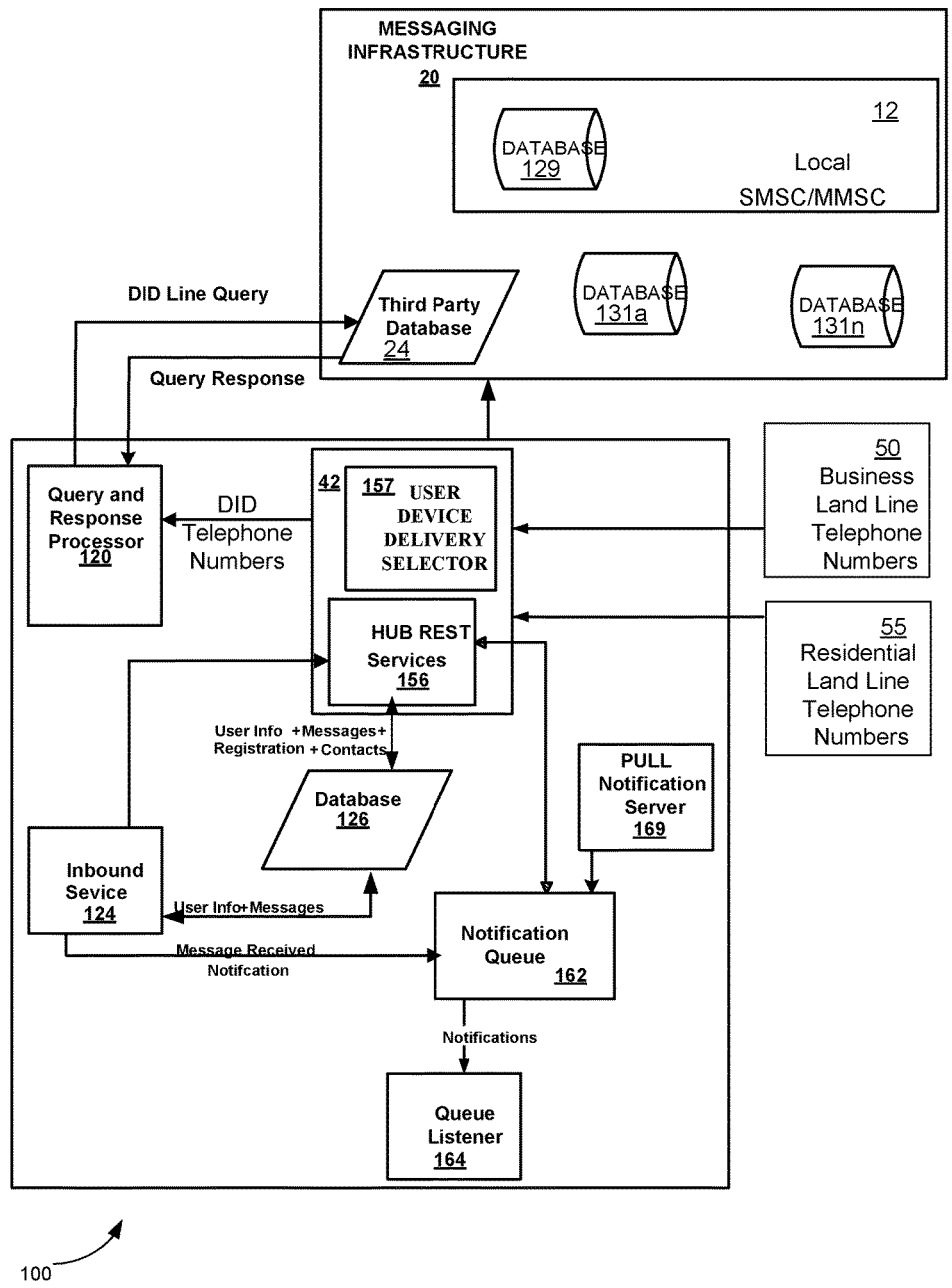
FIG. 3 is a schematic illustration of the messaging hub of FIG. 1.

Now referring to FIG. 3, another embodiment of a messaging hub 100 includes a Query and Response processor 120 which queries third party databases 24 and processes the responses as described below in further detail in conjunction with FIGS. 4-6.

The components of the messaging hub 100, in one embodiment, are developed in C, C++, JAVA ® or other suitable programming language, and include web servers, such as Apache, Microsoft Internet Information Services platform (IIS) or other suitable server systems operating on a UNIX, Microsoft or other operating system platform to store and communicate messages to Internet devices. An exemplary software framework for the messaging hub 100 includes the following:

The Hub application 42 on servers 152*a*-152*n* runs, for example, on a .Net framework and is hosted on a Microsoft IIS7 system on a windows 2008 server.

The database 126 is a relational database implemented in this embodiment using a 2008 SQL Server, and the message processing engine 128 is implemented as a COMET server, using Frozen Mountain's COMET engine (using .net framework on IIS7).

The SMS provider 120 is a C++server application which interacts with the messaging infrastructure 20.

In operation, the Query and Response processor 120 communicates with third party databases 24 to formulate queries about DID lines and process responses from the third party databases 24. The messaging hub 100 consolidates message delivery into a common message conversation queue 130 and intermixes messages from other messaging services, including presence activity and geographic location data into the common message conversation queue 130. This consolidation, allows the messaging hub 100 to enable personal replies to be threaded back to the user's inbox so individual chat conversations can continue across multiple data enabled devices to provide multi-screen messaging.

A user can read a message from anywhere and respond on any device with the same phone number. Chat based systems, such as Facebook, are operated using the common message conversation queue 130 to facilitate combined common message conversations.

When used to support multiple mobile network providers, advantageously, the messaging hub 100 is configurable for each provider. An instance of the messaging hub 100 is set up for each Enterprise and includes separate instances of the database 126. It is understood that the various server functions of the messaging hub 100 could be run on a single computer or multiple computers, storage could be provided by individual storage media or a storage area network.

Message auditing provides the function of logging of message traffic encompassing time, date, duration, origin, destination and network related data. The purpose of such data can be used for accounting purposes (financial, technical), law enforcement compliance requests, data statistical analysis and archival retention for future reference. All or set filtered messages that flow through the UCS 50 can be set to record desired auditing data.

The messaging hub 100 includes a Hub unified communications service (UCS) application 70 which communicates with a corresponding UCS application 72 in the unified communications service 50 over the secure connection 60.

An enterprise office telephone number (or a block of numbers) is transferred to the messaging hub 100. The enterprise office telephone numbers are pushed or published into the database of the various directories, for example a database 129 of the local SMSC/MMSC 12 or databases 131a-131n of other SMSC/MMSCs in the global messaging infrastructure 20. The messaging hub also registers enterprise office telephone numbers in a database 126. In one embodiment, the enterprise office telephone numbers are registered in a plurality of virtual databases 127a -127n (supported by physical database 126), each virtual database corresponding to a different enterprise.

Landline numbers are not typically registered with any of the operators or SMS/MMS aggregators within the mobile ecosystem. When SMS/MMS messages are processed by a mobile operator or SMS/MMS aggregator, the aggregator or operator needs to find a registered number in the various directories to determine if the number is a legitimate and active number and where to route the SMS/MMS message. All phone numbers are associated with an "owner of record" in the various databases in the mobile ecosystem and the appropriate routing destination is determined by "who" the owner of record is for the particular number in question. The Messaging hub system 100 enables recognition and routing capabilities by provisioning landline numbers into the various databases in the mobile ecosystem. When an entity such as any mobile operator or SMS/MMS aggregator receives a message for routing, upon query to one or more of the industry's databases, it determines who is the owner of record for the message based on the destination phone number of the SMS/MMS message.

For example in one embodiment, a message with a destination phone number of +1 212 555-1234, that was provisioned by Messaging hub 100 into the various databases, is identified as Messaging hub 100 as the 'owner of record', and thus routed to Messaging hub servers and network for handling. Upon receipt by Messaging hub 100, the SMS provider 120 in conjunction with the web servers 152 which maintain state and session information and using records in the database 126 can determine the actual user of the phone number and locate the active devices by the user wherever the devices is using the Internet, then deliver the message to the device, or queue the message if no session is possible with any of the user devices associated with the user at the time the message arrives. The directories including these databases are situated in a local or regional network. There are copies of a government master directories and subsets of the master government directories which are used and provided by the government.

Provisioning of the enterprise office telephone numbers (obtained from the UCS 50 through UCS application 72 and Hub UCS application 70 in the messaging hub 100) into all the assorted databases, public and private, in the global messaging infrastructure 20 requires recognition and allowance by the mobile operators for mobile messages from non-mobile operator sources to flow through the network. This recognition and allowance is provided in advance of provisioning of enterprise office telephone numbers. As a result of provisioning by the message hub 100, the enterprise office telephone numbers reside and are registered in databases that are queried by the SMSC/MMSCs.

Every SMS/MMS message originating or terminating from a predefined set of enterprise office telephone numbers is also associated with a specific or group of specific an identification data element, for example a Service Profile Identifier (SPID) electronic SPID (eSPID) virtual SPID (vSPID) alternate SPID (AltSPID) identifier of a second service provider (collectively referred to as SPID) or a Session Initiation Protocol (SIP) uniform resource identifier (URI) (SIP URI), in a database for identification purposes of the originating/terminating enterprise. A SIP URI is very similar to an Internet URL and is generally a way to assign an IP address (by pseudo name) to resources as the 'owner' (i.e., accomplishes the same task as a SPID, but using Internet IP technology).

A Letter of Authorization (LOA) is required in order to provision phone numbers into the various industry databases from the "owner of record" of the phone numbers. LOA's are business legal agreements/contracts between two parties that authorize from the owner of record for specified phone numbers to allow the designee permission to use the specified phone numbers for the specific purpose listed in the LOA. LOA's can be generated for a single phone number. However, the normal LOA will cover a range of phone numbers, such as 617-555-0000 through 617-555-9999, or whatever range is designated. If the target phone numbers are not sequentially numbered, then each number would be targeted number would be listed in the LOA.

For example, if X Corp is the "owner of record" of a phone number, but someone else, for example the Messaging hub 100 will route messages on behalf of an some X Corp employee (user of the phone number), an LOA is required by all of the database owner operators to allow "provisioning" into the database of an alternate 'route' for the intended phone number. In other words, the LOA grants "permission" to Messaging hub 100, to utilize the phone number for an alternative purpose as specified in the LOA. Here, Messaging hub 100 uses the LOA to enable SMS/MMS alternative routing. The LOA is the permission to use the phone numbers for the specific purpose, here for SMS/EMS traffic.

A Service Profile Identifier (SPID) is a number that identifies a specific carrier network or subset network of a larger carrier network. A Session Initiation Protocol Uniform Resource Identifier (SIP URI) is a data set that identifies a specific carrier network, subset network of a larger carrier network, network service provider, virtual network service provider or service provider. When an enterprise obtains telephony service 51, a telephone company assigns a SPID to the line. The first 10 digits identify the telephone number, called the Directory Number (DN). All SMS messages are associated with a particular an identification data element (e.g., SPID or SIP URI) for identification/ownership/association purposes, and the SPIDs or SIP URIs are processed by Messaging hub 100. The an identification data element (e.g., SPID or SIP URI) indicates that, for example, an SMS message is coming from or being sent to Enterprise XYZ Corporation. Handling the identification data element is part of the provisioning process. When messaging hub 100 provisions a phone number or block/range of numbers, an identification data element is associated with each number to identify the associated Enterprise user of those numbers.

In one embodiment, E.164 numbers are used. E.164 is an ITU-T recommendation that defines the international public telecommunication numbering plan used in the PSTN and some other data networks. It also defines the format of telephone numbers. E.164 numbers can have a maximum of fifteen digits and are usually prefixed with a '+'. To actually dial such numbers from a normal fixed line phone, the appropriate international call prefix must be used.

The identification data elements (e.g., SPID, ESPID, VSPID and AltSPID) are generated by different organizations. The OCN/SPIDs are generated by NECA (National Exchange Carrier Association) in North America. In the rest of the world, it is handled by its counterpart organizations. ESPID, VSPID and AltSPID are generated by a variety of organizations including NetNumber, TNS, SAP, Syniverse, MACH, Neustar and BICS. ESPID, VSPID and AltSPID are 'private/proprietary' versions of the SPID. They are used by the private databases operated by NetNumber and others to 'route' traffic associated with that particular ESPID/VSPID/AltSPID. The ESPIDs, VSPIDs and AltSPIDs can be used to denote 'sub-category' traffic of a larger SPID (e.g., AT&T) to create sub-categories under AT&T.

The identification data elements (e.g., SIP URIs) are generated by the owning organizations of the service provider of the services being provided to the Enterprise for the non-mobile messaging services. Its purpose is to provide a uniform standard network identification format based upon industry standards utilizing conventional and accepted Internet addressing mechanisms that enable the location of the owning service provider network to be discoverable for routing purposes. It is understood that a SIP URI refers to refers to an Internet IP location/address while an SPID is a label; however both serve a similar identification purpose.

In one embodiment, the provisioning process includes: provisioning the specific office number or block of office landline phone numbers into mobile ecosystem including assigning unique SPID or other network identifier of its unique SMS/MMS traffic for the specific enterprise business and provisioning specified block of numbers to databases of all mobile entities involved in SMS/MMS traffic routing (e.g., Verizon, AT&T, Sybase, Syniverse, etc.). After provisioning, the SMS/MMS routers and handlers in the mobile network recognize the DID's associated with provisioned Enterprise business or residential phone numbers as belonging to a particular identification data element (e.g., SPID or other network identifier) and as such, will route appropriately based on assigned SPID or SIP URI to the messaging hub 100. Whenever any SMS/MMS router or handler within the mobile network encounters a message associated with the corresponding assigned identification data element, the router will either direct the inbound messages toward the messaging hub 100 designated for handling that identification data element or be routed to the appropriate routers or servers for processing for outbound messages.

As part of provisioning, the identification data element assigned to the Enterprise business or residential customer is 'homed' within the messaging hub servers 152 and message processing components for specific Enterprise business traffic (for delivery in both directions based on the identification data element). Provisioned Enterprise business or residential DID traffic is handled as follows:

Outbound messages (MO)—the user of the Enterprise business landline DID sending the SMS/MMS message has the landline DID associated as the origin DID of the SMS/MMS message; and Inbound messages (MT)—the destination Enterprise business SMS/MMS message traffic will be processed by redirection at the messaging hub 100 to the IP session assigned for that destination landline DID; if no session exists at the time of message delivery, the message will be queued for later delivery when an IP session for the landline DID is established;

IP sessions between messaging hub servers 152 and users of Enterprise business landline DID's are setup automatically between the software clients (i.e., data enabled device client app 48) on mobile devices and/or fixed landline terminals (e.g., desk phones with text display capabilities) upon initiation by the user or other automated mechanisms, under control of the Enterprise, user or other administrative entities. Some desk phones, if the phone has a text display and appropriate intelligence in the form of processing capabilities (CPU, memory, etc.) similar to a mobile phone handset or tablet or PC with the appropriate software for the desk phone, could display and send SMS messages as well.

The messaging hub 100 and provisioning process enables a person associated with an enterprise or residential service to use his or her enterprise office or residential telephone number (landline number) for a new purpose: mobile messaging. Mobile messaging using the landline number can be accomplished on any mobile IP device in the world where there is IP connectivity, to send and receive mobile messages, using his or her office landline number. This allows a person to have "one telephone number" for their business or residential communications including voice and mobile messaging, in contrast to having two separate telephone numbers (one for office and one for mobile).

Figure 4:
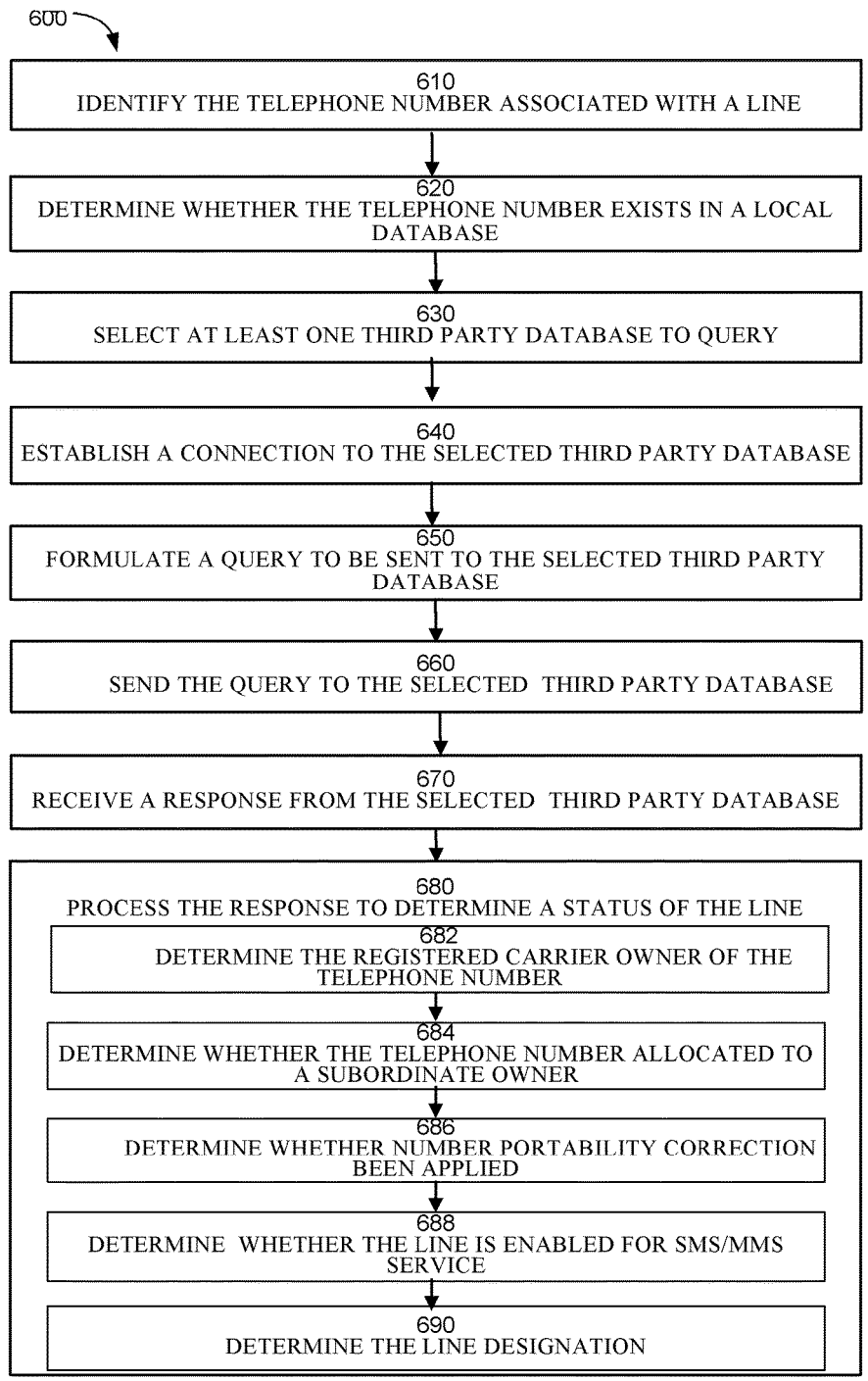
FIGS. 4-5 are flow charts of processing steps performed for determination of status of a line in accordance with one example embodiment disclosed herein.

In FIG. 4, flowchart 600 diagrams the overall process of enabling a telephone number to be used for SMS/MMS/EMS message communication. In step 610 the messaging hub 100 identifies the telephone number associated with a line and determines whether the telephone number exists in a local database in step 620. In step 630, at least one third party database is selected to be queried.

The system keeps a record of success and conflicts with various databases and maintains a list of preferred databases to use. It is noted that the list might be carrier dependent. The top of the directory structure is always the first and preferred database to query, referred to the "root" directory. Barring access to the "root" by which all carriers derive the directory information, subsequent aggregations of the root directory database can also be used.

If there are issues with the query results from the root directory, there are certain feeder directories into the root, specifically the NPAC and the LERG directory databases, (respectively the Number Portability and North American Routing databases).

Additionally, there numerous ENUM database directories (VoIP) that are filled with proprietary information about their respective private networks (e.g.—Comcast, Verizon, Vonage, etc., all maintain their own private ENUM database directories of their own DID's on their own network). Some of the ENUM directories are available on a contractual/permission basis for querying.

After the third party database is selected to be queried, a connection is established to the selected third party database in step 630. A query to be sent to the selected third party database is formulated in step 650, and the query is sent to the selected third party database in step 660.

The following is a sample query:
ENUM Service
  DNS QUESTION
    4.3.2.1.8.4.8.8.7.9.1. IN NAPTR The query will vary based on a variety of variables including variables such as whether the line is a business or residential or whether the line is in US or CA or another country within the +1 dialing zone (North America).

A response from the selected third party database is received in step 670. In step 680, the response is processed to determine a status of the line.

In one embodiment a response has the following format:
  DNS ANSWER
    "!Λ.*$!tel:+19788481234;cic=+100001;mvno=+100321; npdi;type=fixed;!", and an actual a typical response is:
      4.3.2.1.8.4.8.8.7.9.1. IN NAPTR 10 10 "U" "E2U+
        pstn:tel"

Where cic= six digit NNID of the underlying facility carrier that controls the number as per LERG and NPAC. This parameter is always present;

mvno= six digit ID of a messaging service provider in the event that the subscriber number has been sub-assigned for SMS/MMS services. It is noted that this parameter is only present if the subscriber number has been sub-assigned. For example, this parameter will identify the messaging hub 100 for all subscriber numbers sub-assigned to the messaging hub 100 for SMS services;

npdi—indicates portability correction has been performed (always present); and type= designation of the type of service provided by the underlying facility provider. Options are "fixed" or "mobile". This parameter relates to the type of network service provided by the "cic."

It is noted that the parameters have been ordered in alphabetical order as per IETF guidelines.

The response answers some of the following questions:
Does phone number xxxxx exist in the NA phone number directory?
If it does exist then:
　Who is the registered carrier owner of the phone number?
　Is the phone number allocated to a subordinate owner?
　Has number portability correction been applied?
　Is phone number designated a 'mobile' or 'fixed' line?
　Is it already enabled for SMS service?

Determining the status of the line includes determining the registered carrier owner of the telephone number in step 682, determining whether the telephone number allocated to a subordinate owner in step 684, determining whether number portability correction been applied in step 686 and determining whether the line is enabled for SMS/MMS service in step 688. Finally, in step 690, the line designation is determined.

Figure 5:
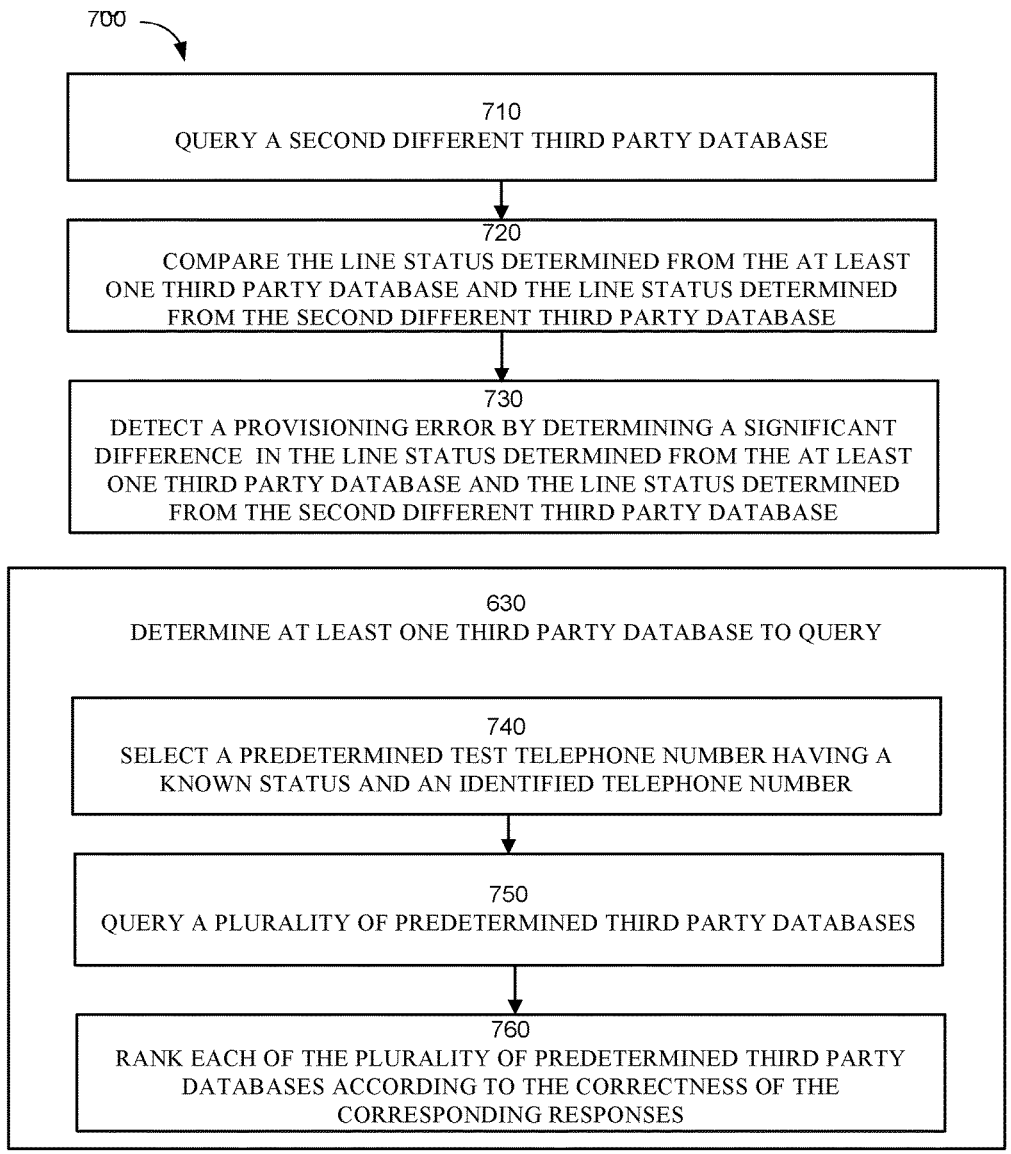

FIG. 5 diagrams further steps in the process of enabling a telephone number to be used for SMS/MMS/EMS message communication by the messaging hub 100. In step 710 a second different third party database is queried. In step 720, the line status determined from the at least one third party database and the line status determined from the second different third party database are compared, and in step 730, provisioning errors are detected by determining a significant difference in the line status determined from the at least one third party database and the line status determined from the second different third party database. A significant difference includes situations where one third party database states the DID telephone number/line belongs to company 'X' while another third party database shows that the DID telephone number/line belongs to company 'Y'. Another example of a significant difference includes situations where the DID has been ported (meaning it is pointed to another owner/location). Still another example of a significant difference includes situations where one third party database states the DID telephone number is mobile telephone number while a different third party database states that the DID telephone number is landline.

If the system determines that there is a conflict of some sort upon querying one or more of the third party databases, the system contacts the various database governing authorities and sends an alert identifying the problem and requesting correction or resolution. If the system has previously obtained an LOA (Letter of Authorization) either electronically or manually entered into the system, an electronic copy is sent to the database governing authority to prove that the system is the legitimate assigned SMS service provider for the DID in conflict and the request to provision the DID for SMS service should be processed. This procedure is similar to DID number porting. At the end of the day, the customer has the final say on which service provider they want for their DID and is authorized by the LOA.

In one embodiment, the determination of which third party database to query includes selecting a predetermined test telephone number having a known status and an identified telephone number in step 740. In step 750, a number of predetermined third party databases are queried, and each of third party databases is ranked according to the correctness of the corresponding responses in step 760.

Figure 6:
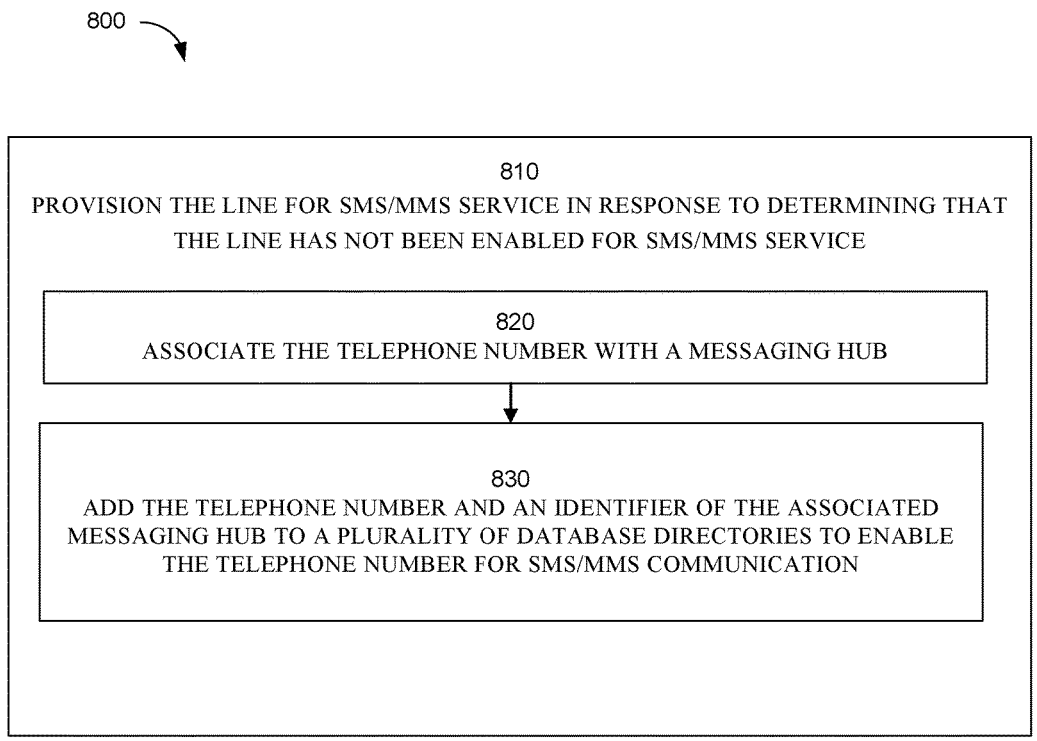
FIG. 6 is flow chart of processing steps performed for provisioning DID telephone numbers after a determination of status of the line as shown in FIGS. 6 and 7.

FIG. 6 diagrams further steps in the process of enabling a telephone number to be used for SMS/MMS/EMS message communication including the provisioning process. In step 810, the line for SMS/MMS service is provisioned in response to determining that the line has not been enabled for SMS/MMS service. In step 820, the telephone number is associated with a messaging hub, and the telephone number and an identifier of the associated messaging hub are added to the database directories to enable the telephone number for SMS/MMS communication.

It is noted that carrier ownership is independent of the provisioned message hub for SMS/MMS communication as carrier ownership only signifies which carrier allocated/provisioned the DID. SMS/MMS communication operates, especially with regard to the messaging hub 100, for example, in an all IP environment, which is completely separate from the public switched voice telephone network (PSTN) network.

In certain embodiments provisioning occurs into a third party directory, a carrier's directory, a government directory or a government master directory. An example of a third party directory includes the Tata Telecom Directory services (Indian conglomerate that provides global directories for carriers). Examples of government master directories include Neustar (the Number Portability database) and Ericsson (the LERG, which is all North American phone numbers and their routes).

Copies of a government mater directories and subsets of the master government directories are used and/or provided by various governments. It is understood, that in some jurisdictions (e.g., North America), it is possible to provision into common databases while in other jurisdictions a similar effect is obtained by provisioning into separate operator databases thereby having a combined effect of provisioning into a common database.

In other embodiments, in which a carrier is provisioning a DID number for SMS/MMS/EMS message communication as described above and the DID number is possibly under its control, the carrier first determines if the DID number is in its local database. If it is determined that the DID number is in its local database, then there is generally no need to query any of the third party databases as described above. After determining that the number is in the carrier's local database, the carrier determines whether the number is already mobile/SMS/MMS enabled. If the number is already mobile/SMS/MMS enabled then no more action is required. If the number is in local database but is not mobile enabled, the number is enabled as described above including provisioning into the third party databases as a mobile enabled number. In addition to provisioning into external database directories (for other carriers to recognize it as mobile messaging capable), the carrier also provisions the number into its network of SMS/MMS equipment (SM-SC's, MMSC's, MSC's, VLR's, HLR's) as a "mobile capable" number.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method for enabling a telephone number to be used for Short Message Service (SMS)/Multimedia Service (MMS)/Enhanced Message Service (EMS) message communication, the method comprising:
   identifying the telephone number associated with a line;
   determining whether the telephone number exists in a database;
       receiving a Letter of Authorization (LOA) from a business owner of record of the telephone number;
   determining whether there is a conflict in the telephone number provisioning;
   wherein determining a conflict includes:
       determining a registered carrier owner of the telephone number;
       determining whether number portability correction been applied; and
       determining whether the line is enabled for SMS/MMS/EMS service;
       in response to determining that there is a conflict, transmitting an electronic copy of the LOA to a governing authority.

2. The computer-implemented method of claim 1, wherein determining a conflict further includes: determining whether the telephone number is allocated to a subordinate owner.

3. The computer-implemented method of claim 1, further comprising determining the conflict by:
   querying to provide a first line status from a first database including one of:
       a carrier database;
       an industry database; and
       an SMS/MMS aggregator database;
   comparing the results of first line status to a second line status from a second different database including one of:
       a carrier database;
       an industry database; and
       an SMS/MMS aggregator database.

4. The computer-implemented method of claim 3, further comprising:
   detecting the conflict by determining a significant difference in the line status determined from the first database and the line status determined from the second different database.

5. The computer-implemented method of claim 1, further comprising provisioning the line for SMS/MMS service in response to determining that the there is no conflict.

6. The computer-implemented method of claim 5, wherein provisioning the line includes:
   associating the telephone number with a messaging hub; and
   adding the telephone number and an identifier of the associated messaging hub to a plurality of database directories to enable the telephone number for SMS/MMS communication.

7. A system for enabling a telephone number to be used for Short Message Service (SMS)/Multimedia Service (MMS)/Enhanced Message Service (EMS) message communication comprising:
   a memory including one or more instructions stored thereon that, when executed by one or more processors, cause the one or more processors to perform operations comprising:
       identifying the telephone number associated with a line;
       determining whether the telephone number exists in a local database;
       receiving a Letter of Authorization (LOA) from the owner of the telephone number;
       determining whether there is a conflict in the telephone number provisioning;
       wherein determining a conflict includes:
           determining a registered carrier owner of the telephone number;
           determining whether number portability correction been applied; and
           determining whether the line is enabled for SMS/MMS service;
       in response to determining that there is a conflict, transmitting an electronic copy of the LOA to a governing authority.

8. A computer-implemented method for enabling a telephone number associated with a carrier to be used for Short Message Service (SMS)/Multimedia Service (MMS)/Enhanced Message Service (EMS) message communication, the method comprising:
   identifying the telephone number associated with a line;
   determining whether the telephone number exists in a local carrier database;
   in response to determining that the telephone number exists in the local database determining whether the line is enabled for SMS/MMS service;
   receiving a Letter of Authorization (LOA) from the owner of the telephone number;
   determining whether there is a conflict in the telephone number provisioning;
   wherein determining a conflict includes:
       determining a registered carrier owner of the telephone number;
       determining whether number portability correction been applied; and
       determining whether the line is enabled for SMS/MMS service;
   in response to determining that there is a conflict, transmitting an electronic copy of the LOA to a governing authority;
   provisioning the line for SMS/MMS service in response to determining that the line has not been enabled for SMS/MMS service; and
   wherein provisioning the line includes adding the telephone number and an identifier of the carrier to a plurality of database directories to enable the telephone number for SMS/MMS communication.

9. The method of claim 8 further comprising provisioning the number into a local carrier's network of SMS/MMS equipment as a mobile capable number.

10. The computer-implemented method of claim 1, wherein the LOA includes a range of telephone numbers.

* * * * *